United States Patent [19]

Severin

[11] 3,735,254
[45] May 22, 1973

[54] METHOD OF DETERMINING THE SHEET RESISTANCE AND MEASURING DEVICE THEREFOR

[75] Inventor: Petrus Johannes Wilhelmus Severin, Emmasingel, Eindhoven, Netherlands

[73] Assignee: U.S. Philips Corporation, New York, N.Y.

[22] Filed: June 3, 1971

[21] Appl. No.: 149,533

[30] Foreign Application Priority Data

June 6, 1970 Netherlands ..................7008274

[52] U.S. Cl. ..............324/64, 324/158 D, 324/158 P
[51] Int. Cl. ..............................................G01r 27/14
[58] Field of Search ................324/64, 158 R, 158 D, 324/158 P

[56] References Cited

UNITED STATES PATENTS 3,609,537  9/1971  Healy et al. ...........................324/64
3,611,125  10/1971  Sharon et al. .........................324/64

Primary Examiner—Stanley T. Krawczewicz
Attorney—Frank R. Trifari

[57] ABSTRACT

The invention relates to the determination of the sheet resistance (resistance per square) of a layer which changes into a second layer via a rectifying junction. In this determination, four or more electrodes are arranged on the layer to be measured, for example on a straight line. In a first step, a current is conveyed through two electrodes at a comparatively low voltage and the voltage associated with said current is determined between two other electrodes as is usual in a normal four point measurement. In a second step of the measurement the same measurement is carried out without changing the place of the electrodes but while changing a current supply and a voltage take-off electrode, with the difference that at least electrodes for current supply or voltage measurement have a different distance as compared with that of the first measurement. The sheet resistance or a quantity associated therewith is obtained in an accurate manner from the results.

12 Claims, 8 Drawing Figures

INVENTOR.
PETRUS J. W. SEVERIN
BY

AGENT

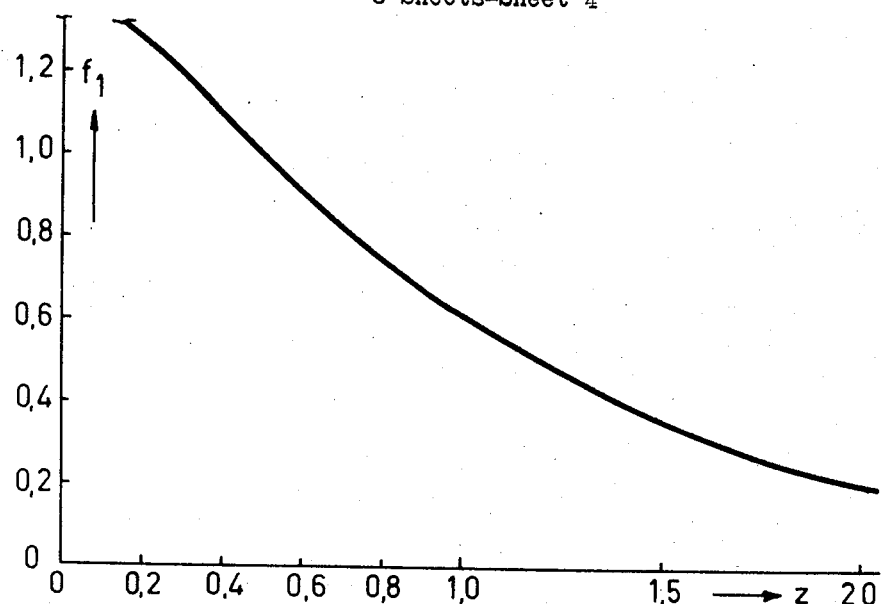
Fig. 6
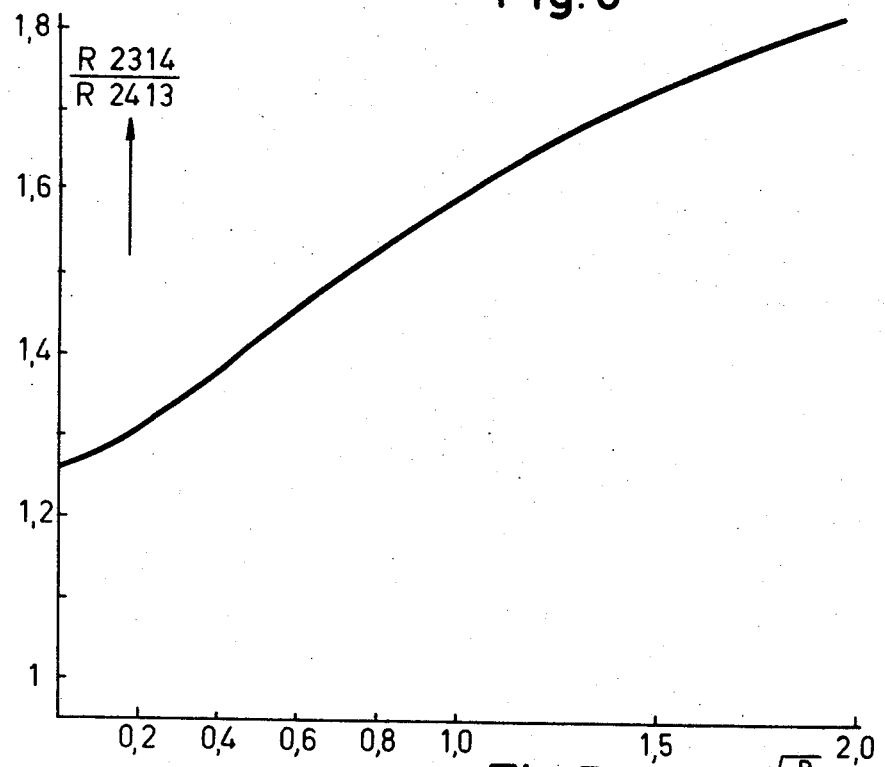
Fig. 7 $\longrightarrow z = S\sqrt{\frac{g}{dR}}$
INVENTOR.
PETRUS J. W. SEVERIN
BY
AGENT

METHOD OF DETERMINING THE SHEET RESISTANCE AND MEASURING DEVICE THEREFOR

The invention relates to a method of determining the sheet resistance or a quantity associated therewith, in particular in manufacturing a semiconductor device, in which at least four electrodes are placed at a distance from each other on a layer to be measured, said layer changing into a second layer via a rectifying junction, in particular a p-n junction, a current being conveyed between two electrodes, the voltage associated with said current being determined between two other electrodes, the sheet resistance or a quantity associated therewith being determined from the results; the invention furthermore relates to a measuring device for use of this method.

The resistance per square $R_s$, sometimes termed "sheet resistance," of a layer the thickness $d$ of which is expressed in cm and the resistivity $\rho$ of which is expressed in Ohm.cm, is to be understood to mean in the usual manner the resistance of a square piece of said layer through which a current flows in the lateral direction. This resistance, briefly $R^s$, is equal to $\rho/d$. This applies to material having a substantially homogeneous $\rho$; in the case of a non-homogenous material having an impurity concentration gradient in the direction of the thickness, $\rho$ is the inverse of the average specific conductivity of the layer.

This quantity is of great importance in particular in the manufacture of a semiconductor device, because it provides information on various characteristic quantities of the semiconductor material, for example, $\rho$ or the doping concentration which afterwards will determine the electric properties of the semiconductor device.

A conventional method for the determination of $R_s$ is the method of the type mentioned in the preamble, known as the four-point method, in which four electrodes are placed on the layer to be measured, usually in a straight line and at equal distances between two successive electrodes, and in which a known current $i$ is conveyed usually through the two outermost electrodes, the voltage $V$ associated with said current being determined between the two innermost electrodes.

On the condition that the thickness of the layer is small relative to the distance between two successive electrodes, i.e. smaller than 0.7 $x$ said distance, $R_s$ in Ohm is then determined according to the known formula $V/i = 1/4.5\ R_s$, where V and $i$, respectively, are expressed in volts and amperes, respectively. This measurement is usually combined with another measurement which is also known per se, for example, by grinding down the layer at a small angle after which the thickness $d$ of the semiconductor zone to be measured and hence also $\rho$ can be determined under a microscope.

The method is used inter alia if the semi-conductor body consists of a piece of a semiconductor material, for example silicon, which is homogeneously doped with an impurity which determines the conductivity type of the semiconductor body, for example phosphorus. The method is applied in particular to layers of one conductivity type which are provided by means of known methods of expitaxy or diffusion on a substrate of the opposite conductivity and are interconnected via a rectifying junction. In the case in which the layer and the substrate are of the same conductivity type, for example, an n-layer on an n⁻-substrate, the method is applied to a layer which under the same conditions has been provided on a substrate of the opposite conductivity type and via this roundabout way data can be obtained of the n-layer or the n⁻-substrate.

With a given thickness $d$, $R_s$ of the measured layer may be used in a measure of the resistivity which intern is a measure of the doping concentration and hence, for example, of breakdown voltages which may occur in the semiconductor device to be manufactured. If conversely $R_s$ is known, the thickness $d$ of the layer with a given $\rho$ can be determined. It is also possible by determining $R_s$ to check during the manufacture of a semiconductor device the reproducibility of one or several process steps or, by using a given value of $R_s$ as a standard, to use a selection within certain limits from the starting material as a result of which the production occurs within narrower tolerances and hence the reject percentage in a later production stage can be reduced.

Whereas in practice the method is often applied to layers which are provided on a substrate of the opposite conductivity type and form a p-n junction with said substrate, it has been found from experiments which have led to the present invention that, in spite of the blocking effect of the p-n junction, a deviation occurs as a result of leakage currents, which upon measurement provides too low a value for $R_s$ and which, in case higher requirements are imposed, constituted a disturbing factor which is unknown in value.

One of the objects of the invention is to provide a simple method to increase the accuracy of the measurement.

Another object of the invention is to provide a simple method to check the lateral uniformity of the layer to be measured over the substrate.

The invention is characterized in that, after the electrodes are arranged on the layer to be measured, at least two of the said measurements are carried out with the same arrangement of the electrodes on the layer and that said measurements are carried out with a voltage difference between the two current-conveying electrodes, in which across the rectifying junction and the p-n junction, respectively, a voltage difference is formed in a range of voltages across the rectifying and the p-n junction, respectively, in which same behaves as a substantially constant resistance, preferably near the zero point of the current-voltage characteristic, and that during the first measurement a current is conveyed through two electrodes, hereinafter termed the first pair of electrodes, while the voltage is determined between two other electrodes, hereinafter termed the second pair of electrodes, and that during the second measurement four electrodes are selected with a different distance between at least two electrodes relative to the first measurement, in which a current is conveyed through two of the said electrodes while the voltage is determined between the two remaining electrodes of the said electrodes, the sheet resistance or a quantity associated therewith being determined from the results of said measurements.

Although it is advantageously possible to use a measuring probe having more than four electrodes and to vary the distance between the electrodes in at least two of the said measurements, for example, by including a fifth electrode during the second measurement a preferred embodiment of the method according to the invention is characterized in that four electrodes are arranged on the layer to be measured and during the second measurement a current is conveyed through an electrode of the first pair of electrodes and an electrode of the second pair of electrodes, while the voltage is determined between the remaining electrodes of the first and the second pair of electrodes, the sheet resistance or a quantity associated therewith being determined from the rsults of the two measurements.

Since in the method according to the invention the measurements are carried out with a voltage difference between the two current-conveying electrodes in which across the rectifying junction a voltage difference is formed in a range of voltages in which the rectifying junction behaves as a substantially constant resistance, preferably near the zero point of the current-voltage characteristic, it is achieved that the influence of the rectifying junction on the current passage through the layer to be measured can be described as a layer extending parallel to the layer to be measured and having a substantially uniform contact resistance distribution $R_0$ (which is still unknown in value) to the second layer which, with the usual small electrode distance or due to homogenous contacting or due to the large thickness and/or high specific conductivity, may be considered as a plane of substantially constant voltage. Since in addition at least two measurements are carried out in which a current electrode and a voltage electrode can simply be interchanged, the two unknown quantities $R_0$ and $R_s$ can be determined from said two measured results which can be obtained in a simple manner via the functional relationship between measured currents, voltages, $R_0$ and $R_s$ which can be computed in a simple manner and holds good with the given electrode configuration, as will be described in detail hereinafter.

Therefore, the method according to the invention may advantageously be used also to determine the contact resistance, which quantity provides information on the interface between the two layers.

In the measurement with low voltage, the substrate in a floating condition will assume a voltage which lies approximately centrally between the potentials of the two current-conveying electrodes, in which leakage current will flow away to the substrate substantially via one half of the current path and will return via the other half. By measurements on the substrate or on the two other electrodes it can be found out whether this condition has been satisfied. The voltage at the current-conveying electrodes is preferably chosen to be so that the voltage across the rectifying junction and p-n junction, respectively, is smaller than $KT/q$ and preferably smaller than $\frac{1}{3}(KT/q)$, where K is Boltzmann's constant, T the absolute temperature and $q$ the elementary quantity of charge. At 18° C this means maximally 25 mV and less than 10 mV, respectively, in which case the imposed condition has always been met for practical purposes. According as the operating voltage is lower and thus a constant value of $R_0$ in the voltage range is approached more closely, the more accurate are the measured results. In an analogous manner the invention may advantageously be used if in another range of voltages the rectifying junction can be described as a substantially constant $R_0$. It will be obvious, however, that one of the advantages of measurement at the said low voltage is that the influence of the penetration of the depletion layer is kept small.

Good results are obtained by means of the method according to the invention when, in addition to the conditions applying already to the usual four point method, it may be assumed that the layer over a region covered by the measuring electrodes is uniform in a lateral direction of the layer. If inhomogeneities occur, extra unknown factors are introduced by them which necessitate further measurements or at least make the two measurements according to the invention for exact determination of $R_s$ less suitable. According to a further embodiment of the method according to the invention an indication on the lateral uniformity can be obtained in a simple manner in the case of doubt when, according to the invention, after the second measurement a third similar measurement is carried out with the same arrangement of the electrodes, in which a pair of electrodes is formed by the electrode through which in the two preceding measurements current was conveyed and the electrode which was used in the two preceding measurements to determine the voltage, and in which the two remaining electrodes constitute the second pair of electrodes and in which a current is conveyed through the electrodes of one of the two said pairs of electrodes, while between the electrodes of the other pair of electrodes the voltage associated with said current is determined, information on the lateral uniformity of the layer and the junction being obtained from the results of the three measurements.

As will be described in detail hereinafter, it is found that a simple reationship must exist between the measured results of the said three measurements so that in this simple manner a test can be obtained on the uniformity of the layer. It wil be obvious that besides for the direct determination of $R_s$ or quantities associated therewith, the method according to the invention can also be useful to test a layer for uniformity.

According to a preferred embodiment, four punctiform electrodes are arranged on a surface of the layer to be measured, the electrodes at the surface being arranged on a straight line and at equal distance between two successive electrodes because in that case the conventional four point measuring apparatus can be used and the measured results can be handled in a comparatively simple manner. The first pair of electrodes can advantageously be constituted by the two outermost electrodes, the second pair of electrodes being constituted by the two innermost electrodes, the sheet resistance of a quantity associated therewith being determined from the results in cooperation with a previously composed table.

The invention is of particular importance for the determination of the sheet resistance or a quantity associated therewith of a layer of one conductivity type which is arranged on a layer of the opposite conductivity type.

In addition, the method is also suitable for cases in which the layer to be measured constitutes a rectifying hetero junction to a second layer of another metal, in which, for example, the layer to be measured and the substrate are different semiconductor materials of the same or the opposite conductivity types or in which one of the two layers is a metallically conductive layer which constitutes, for example, a Schottky junction with a semiconductor layer.

Furthermore, the invention is of particular use in the determination of $R_s$ or a quantity associated therewith of a thin and high ohmic layer of which in particular the thickness is smaller than $6/\mu$ and the resistivity larger than 5 Ohm.cm, because for these layers the deviation to be charged with the method according to the invention is of importance and the deviations as a result of the penetration of the depletion layer in the layer to be measured can be kept small exactly with a measurement at a low voltage.

The method according to the invention can also be used advantageously with a layer of one conductivity type on a substrate of the opposite conductivity type which has been conducted along as a test body during the provision of a layer of one conductivity type on a substrate of the same conductivity type, in which in the same circumstances a layer of one conductivity type is formed on the test body and on the substrate of one conductivity type, the sheet resistance or a quantity associated therewith of the layer of one conductivity type on the substrate of the same conductivity type being determined from the result of the measurement at the test body.

The results obtained by the measurements at the test body are a good measure of the sheet resistance of the relevant layer of the other semiconductor bodies and with a given thickness the resistivity of the layer of the other semiconductor bodies can then be determined.

The method according to the invention can furthermore be used advantageously for the determination of $R_s$ in the manufacture of layers of one conductivity type on layers of the same or the opposite conductivity type, inhomogeneities in the lateral direction being present at the interface due to the local presence of buried layers. For that purpose, the influence of the buried layers may advantageously be eliminated, if desirable, by using the method according to the invention on a layer of one conductivity type on a substrate of the opposite conductivity type which has been conducted along as a test body during the provision of a layer of one conductivity type on a substrate of the same or the opposite conductivity type, inhomogeneities in the lateral direction being present at the interface due to the local presence of buried layers, the sheet resistance or a quantity associated therewith of the layer of one conductivity type on a substrate of the same or the opposite conductivity type with buried layers locally present at the interface being determined from the result of the measuremnts at the test body.

The invention furthermore relates to a measuring device suitable for use of the method according to the invention, for which purpose the device comprises means by which a current can be conveyed through two electrodes, while the voltage can be determined between two other electrodes, said four electrodes constituting a first electrode combination, and by which a second combination of four electrodes can then be chosen with a different distance between at least two electrodes relative to the first combination of four electrodes, in which a current can be conveyed through two electrodes of the second combination, while the voltage can be determined between the two remaining electrodes of the second combination.

The invention is of particular importance for an accurate determination of the sheet resistance itself but may be of equal importance for the determination of other quantities associated with the sheet resistance. Examples thereof are, for example, with a given resistivity $\rho$, the thickness $d$, or with a given thickness $d$, the resistivity $\rho$ of the layer or the concentration N of the impurities determining the conductivity type which are again associated with $\rho$ or $R_s$ in accordance with known formulae. Nor is it sometimes necessary to know the value of the sheet resistance itself but it is sometimes necessary indeed to find out whether it lies within a given range or to find out whether it is uniformly divided over a layer in different places; in such cases, $R_s$ can be determined directly and be compared with the standard, or said $R_s$ may be expressed in another quantity associated with $R_s$ such as, for example, the voltage difference occurring between two electrodes with constant other parameters, which voltage difference should lie within certain standards. It will be obvious that the invention is also useful in such cases and the expression "determination of the sheet resistance or a quantity associated therewith" should therefore be considered in the above general sense.

In order that the invention may be readily carried into effect, it will now be described in greater detail with reference to a few figures and embodiments.

FIGS. 6, 7 and 8 are graphs which may be used in the method according to the invention.

Before entering in detail into the method according to the invention, a few calculations underlying the invention of the general case of four or more electrodes at different distances from each other will be explained in detail so that the relationship between the current, voltage and sheet resistance to be determined during the measurement can be determined.

Figure 1:
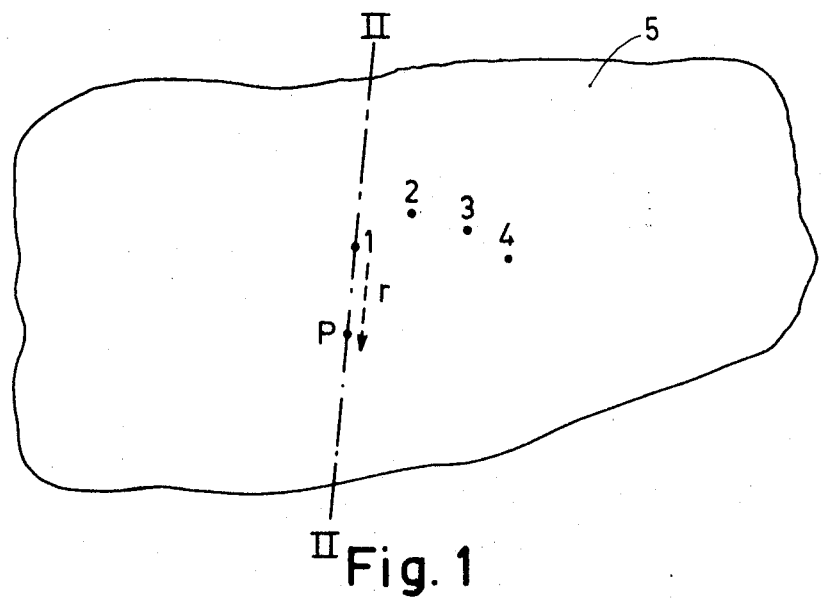
FIGS. 1 and 2 are a diagrammatic plan view and a cross-sectional view, respectively, of the layer to be measured which is arranged on a substrate.
Figure 2:
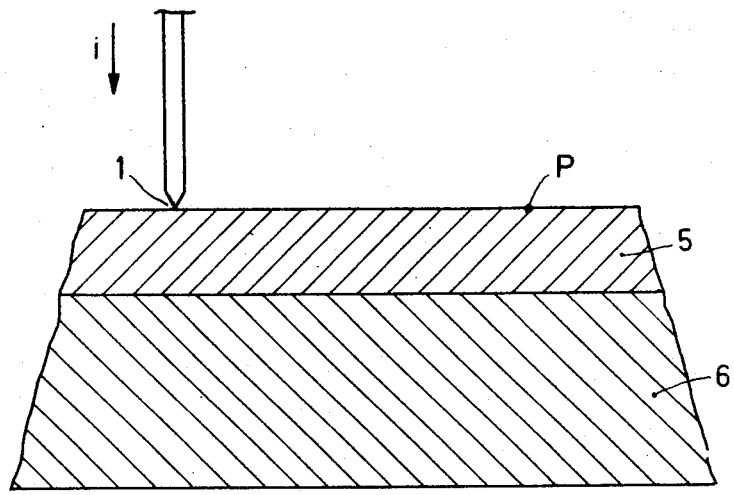

For that purpose, FIG. 1 is a diagrammatic plan view of a semiconductor body on which four points are denoted by 1, 2, 3 and 4, respectively. FIG. 2 is a cross-sectional view taken on the line II — II which passes through point 1 and an arbitrary point P. The semiconductor body consists of a layer 5 of one conductivity type which is provided on a substrate 6 of the opposite conductivity type which, owing to the comparatively large thickness and high degree of impurity, may be considered as readily conducting. Four punctiform electrodes are arranged on the layer 5 in the points 1, 2, 3 and 4, respectively.

In order to determine the voltage difference between two electrodes, for example between 2 and 3, when between the electrodes 1 and 4 a current is conveyed, first the derivatives are now given of the determination of the voltage V which occurs at an arbitrarily chosen point P when, for example, a current $i$ is conveyed in the layer by the electrode 1. The distance between the points 1 and P is denoted by the coordinate $r$. It is furthermore assumed that the thickness of the layer is so small relative to the distances between the electrodes and the distances between the electrode and point P that a voltage difference, if any, occurring across the layer in the direction of the thickness may be neglected. It is furthermore assumed that the edges of the layer 5 are present at sufficiently large distances from the electrodes to be able to neglect boundary effects. The radial voltage gradient, i.e. the voltage decline in the layer, for example, on the line II — II in FIG. 1 is then determined by the equation:

$$dV/dr = -1/2 \rho r \, (\rho/d) i(r) \quad (A)$$

wherein
$V =$ the voltage expressed in volts
$r =$ the distance from point 1 to an arbitrary point P in cms
$d =$ the thickness of the layer 5 in cms
$i(r) =$ the current in amperes
$\rho =$ the resistivity of the layer in ohm cm.

Figure 3:
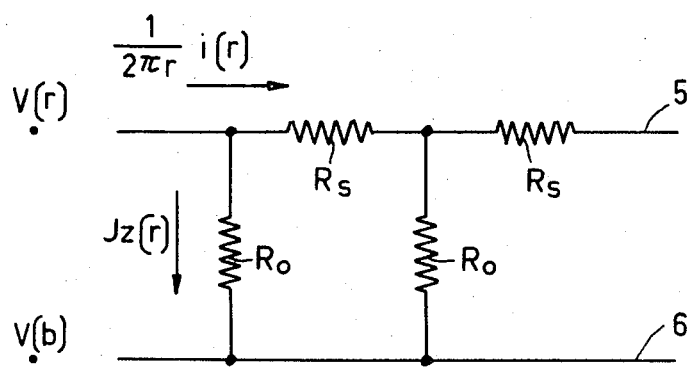
FIG. 3 shows diagrammatically an equivalent circuit diagramm of the stratified structure to be measured.

$i(r)$ in the above equation generally is not equal to the current $i$ through the electrode 1, but a function of $r$. Because the layer and the substrate are not perfectly insulated from each other, a current component in a direction at right angles to $i(r)$ as is diagrammatically denoted in the equivalent circuit diagram in FIG. 3, occurs between the layer 5 and substrate 6. In FIG. 3 the layer 5 and the substrate 6 are interconnected by finite contact resistances $R_0$, expressed in Ohm cm$^2$, via which a current $J_z(r)$, expressed in ampere cm$^{-2}$, flows away to the substrate. This approximation is permitted when, as in the case of the invention, such low voltages are used that the voltage across the p-n junction adjusts the p-n junction in a region near the origin of the current-voltage characteristic where the diode resistance distribution $R_0$ averaged in the forward and the reverse direction is a substantially constant. The current variation of $i(r)$ as a function of $r$ is then determined by the equation:

$$di(r)/dr = -2\pi r \, J_z(r) \quad (B)$$

while the relationship between the voltage $V(r)$ and the current density $J_z(r)$ is determined by:

$$V(r) - V_b = R_0 J_z(r) \quad (C)$$

in which the substrate is assumed to be a plane of substantially constant potential $V_b$, which is permitted in practice with the usual substrates of comparatively large thickness and/or high specific conductivity and with the usual small electrode distances.

By substitution of the equations B and C, equation A may finally be written as:

$$d^2V(r)/dr^2 + (1/r)(dV(r)/dr) - 1/\Lambda^2 (V(r) - V_b) = 0 \quad (D)$$

where $V_b$ is the voltage of the substrate, and $\Lambda$ is equal to $$(R_0 d/\rho)^{1/2}.$$

This is the basic equation for the measurements underlying the present invention and with given boundary conditions, said equation may be solved and the relationship between the parameters be obtained. A solution to the above differential equation (D), when the boundary effects can be neglected, which is practice means that the electrodes must preferably be present at a distance from the edge which is large, for example twice as large, relative to the maximum distance between the electrodes, is the equation:

$$V(r) - V_b = A K_0 (r/\Lambda), \quad (E)$$

where
$a = i/2\pi \, \rho/d$ and $K_0 (r/\Lambda)$ is the modified Bessel function of the zero order of the second kind which can be found in table form, for example, in M.W. Mc. Lachlan "Besselfunctions for engineers," Clarendon Press Oxford, second ed. p. 221.

For example, by supplying a current $+i_{14}$ and $-i_{14}$ to the layer at the points 1 and 4, respectively, and superimposing the voltages, $$V_{23} \equiv V_2 - V_3 = A_{14} [ \, K_0 \, (r_{12}/\Lambda) - K_0 \, (r_{13}/\Lambda) - K_0(r_{24}/\Lambda) + K_0(r_{34}/\Lambda) \, ] \quad (F_1)$$

is obtained for the voltage difference between the points 2 and 3 with $A_{14} = i_{14}/2\pi \, \rho/d$. With given distances $r_{ij}$ between the electrodes and a given current $i_{14}$, this equation comprises two unknowns, namely $\rho/d$ and $R_0$, and it is thus not possible to determine, for example, $\rho/d$ by a single measurement. At least two independent equations are necessary. It is possible indeed to calculate with given electrode distances the factor between [ ] symbols as a function of $\Lambda$.

According to the method of the invention, a second measurement is carried out in which, for example, a current $i_{13}$ is conveyed through the electrodes 1 and 3, while the voltage $V_{24}$ is determined between the electrodes 2 and 4. By interchanging the indices 3 and 4 in equation $F_1$, $$V_{24} = A_{13} [ \, K_0(r_{12}/\Lambda) - K_0 \, (r_{14}/\Lambda) - K_0 \, (r_{23}/\Lambda) + K_0 \, (r_{34}/\Lambda) \, ] \quad (F_2)$$

is found for the voltage difference $V_{24}$. Division of $F_1$ by $F_2$ then gives:

$$\frac{V_{23}}{V_{24}} = \frac{A_{14}}{A_{13}} \left\{ \frac{K_0\left(\frac{r_{12}}{\Lambda}\right) - K_0\left(\frac{r_{13}}{\Lambda}\right) - K_0\left(\frac{r_{24}}{\Lambda}\right) + K_0\left(\frac{r_{34}}{\Lambda}\right)}{K_0\left(\frac{r_{12}}{\Lambda}\right) - K_0\left(\frac{r_{14}}{\Lambda}\right) - K_0\left(\frac{r_{23}}{\Lambda}\right) + K_0\left(\frac{r_{34}}{\Lambda}\right)} \right\} \quad (G)$$

with $$\frac{A_{14}}{A_{13}} = \frac{i_{14}}{i_{13}}$$

The factor between { } with a given electrode distance can be calculated as a function of $\Lambda$ and be processed in a table or a graph in accordance with $\Lambda$. By determining, from the measured results of the two measurements, the left-hand term of the equation G and the factor $i_{14}/i_{13}$, $\Lambda$ can be determined from the said table. By subsequently substituting the value found for $\Lambda$ in one of the equations $F_1$ or $F_2$, $R_0$ and $\rho/d$ can be determined separately.

In the first measurement and in the second measurement, respectively, of the preceding example, the electrodes 1 and 4 and 1 and 3, respectively were used as current-conveying electrodes, while the remaining electrodes were each time used for the voltage determination. It will be obvious that other electrode combinations may also be chosen, for example, the electrodes 1 and 3 as current-conveying electrodes in the first measurement and the electrodes 1 and 2 in the second measurement each time using the two remaining electrodes for the voltage determination. In an analogous manner an analogous equation of the form G is obtained by drawing up analogous equations $F_1$ and $F_2$ with the relevant distances $r_{ij}$. The method according to the invention may also be used with a number of electrodes exceeding four, for example, five electrodes, of which in the first measurement four electrodes are used, two of which for the current, for example 1 and 5, and two for the voltage determination, for example 2 and 4, and another four of said five are used in the second measurment, for example 1 and 4 and 2 and 3, respectively. An equation of the form G can then be obtained in an analogous manner and when the distance between at least two electrodes in the second measurement differs from that in the first measurement, the equations $F_1$, $F_2$ and G can be solved to $R_O$ and $R_s$, because in that case the Bessel functions in the right-hand member of $F_1$ and $F_2$ are not identical and provide independent equations. For that purpose it is sufficient according to the equation G that either the distance between the current conveying electrodes, or the distance between the electrodes which are used for the voltage determination, or the distance between one of the current and voltage electrodes in the second measurement differs with respect to the first measurement. It will furthermore be obvious that an electrode configuration in which different electrodes are used in the two measurements it is true, but in which the electrodes mutually are at the same distance, should not be chosen because in that case the equations $F_1$ and $F_2$ are identical and provide no separate solution for $R_O$ and $R_s$. It is furthermore found that in these measurements it is not only allowed to change both current electrodes with both voltage electrodes simultaneously, because in that case the equations $F_1$ and $F_2$ also become identical. Furthermore the electrodes must of course be chosen so that a voltage difference can be measured indeed which means, for example, that the two voltage electrodes must not be arranged symmetrically on an equipotential plane between the two current-conveying electrodes.

It is obvious from the above that the method according to the invention enables a determination of $R_s$ and $R_O$ with four or more electrodes in which said electrodes need not be located on a straight line.

In the case in which the method is carried out by means of four electrodes, a third measurement may advantageously be carried out which provides data the lateral uniformity of the layer. For example, a current $i_{12}$ is conveyed between electrode 1, which was used in the preceding measurements also as a current-conveying electrode, and electrode 2 which was used in the two preceding measurements to determine the voltage, while the voltage $V_{34}$ is determined between the electrodes 3 and 4. It is then found that:

$$V_{34} = A_{12} [ - K_0(r_{13}/\Lambda) + K_0(r_{14}/\Lambda) + K_0(r_{23}/\Lambda) - K_0(r_{24}/\Lambda) ]$$ (F$_3$)

From the equations $F_1$, $F_2$ and $F_3$ it may be derived that:

$$V_{23}/i_{14} = V_{24}/i_{13} + V_{34}/i_{12} \text{ or } R_{2314} = R_{2413} + R_{3412}$$ (F$_4$)

where $R_{ijkl} = V_{ij}/i_{kl}$ is expressed in ohm.

Of course this relationship holds good only if $\Lambda$ is substantially uniform in a lateral direction throughout the region covered by the electrodes. Because $\Lambda$ is directly associated with $R_s$ and $R_O$, equation $F_4$ may be used to find out in a simple manner about the uniformity of the layer over the substrate. It can be found out in addition whether a determination of $R_s$ according to the invention makes any sense, because in this case also it is assumed that $\Lambda$ is substantially constant throughout the range convered by the electrodes. The condition of uniformity is consequently that one of the measure $R_{ijkl} = V_{ij}/i_{kl}$ must be equal to the sum of the two other quotients in the two other measurements.

It will be obvious from the above that the method according to the invention may advantageously be used with four or more than four electrodes in which it is not necessary for the said electrodes to be arranged on a straight line.

A third embodiment in which a conventional four point probe is used will now be described in greater detail.

Figure 4:
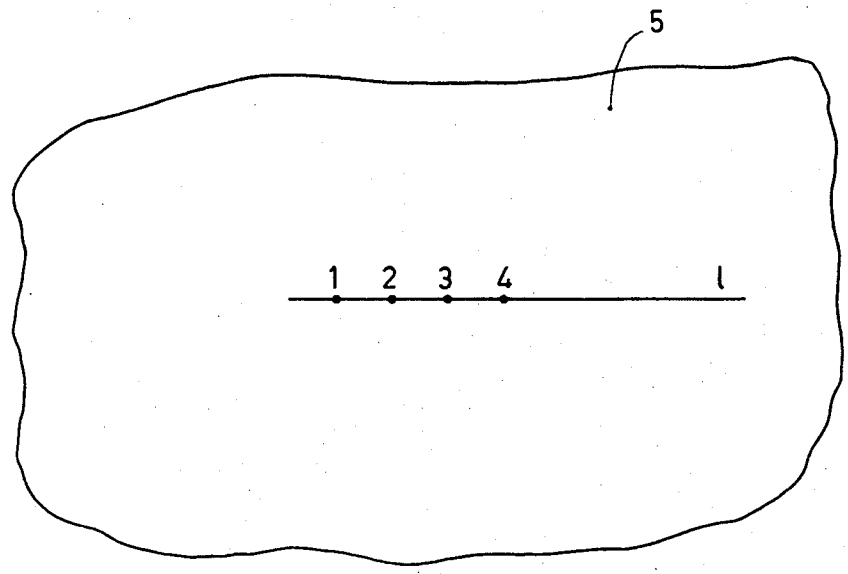
FIG. 4 shows the case in which the four electrodes are arranged on a straight line and at equal distances between two successive electrodes on the layer to be measured.

In this case the points 1, 2, 3 and 4 are located on a straight line 1, the distances between two successive points being each time equal to $s$ as is shown diagrammatically in FIG. 4 in which, for example, $r_{12} = s$, $r_{13} = 2s$, $r_{14} = 3s$. For the voltage $V_{23}$ it is now found, if a current $i_{14}$ is conveyed through the electrodes 1 and 4, that:

$$V_{23} = 2 A_{14} [K_0(z) - K_0(2z) ]$$

where $$z = (s/\Lambda) = s(\rho/R_O d)^{1/2}.$$

For the voltage difference $V_{24}$ in the second measurement is found in an analogous manner that:

$$V_{24} = A_{13} [K_0(z) - K_0(3z)]$$ (K)

and for the voltage difference $V_{34}$ in the third measurement:

$$V_{34} = A_{12} [K_0(z) - 2K_0(2z) + K_0(3z) ]$$ (L)

Because $A_{ij}$ is equal to $i\rho/2d$, these equations may also be written as:

$$V_{23}/i_{14} = R_{2314} = \rho/2\pi d [2 K_0(z) - 2 K_0(2z) ]$$ (H$_1$), $$R_{2413} = \rho/2\pi d [K_0(z) - K_0(3z)]$$ (K$_1$), and $$R_{3412} = (\rho/2\pi d)[K_0(z) - 2 K_0(2z) + K_0(3z) ]$$ (L$_1$)

respectively.

It can easily be found out that in this case also the relation $F_4$ applies:

$$R_{2314} = R_{2413} + R_{3412}.$$

In FIGS. 7 and 6 the quantities $R_{2314}/R_{2413}$ and $f_1(z) = [2K_0(2) - 2K_0(2z)]$, respectively, are drawn in a graph as a function of $z$.

Figure 5:
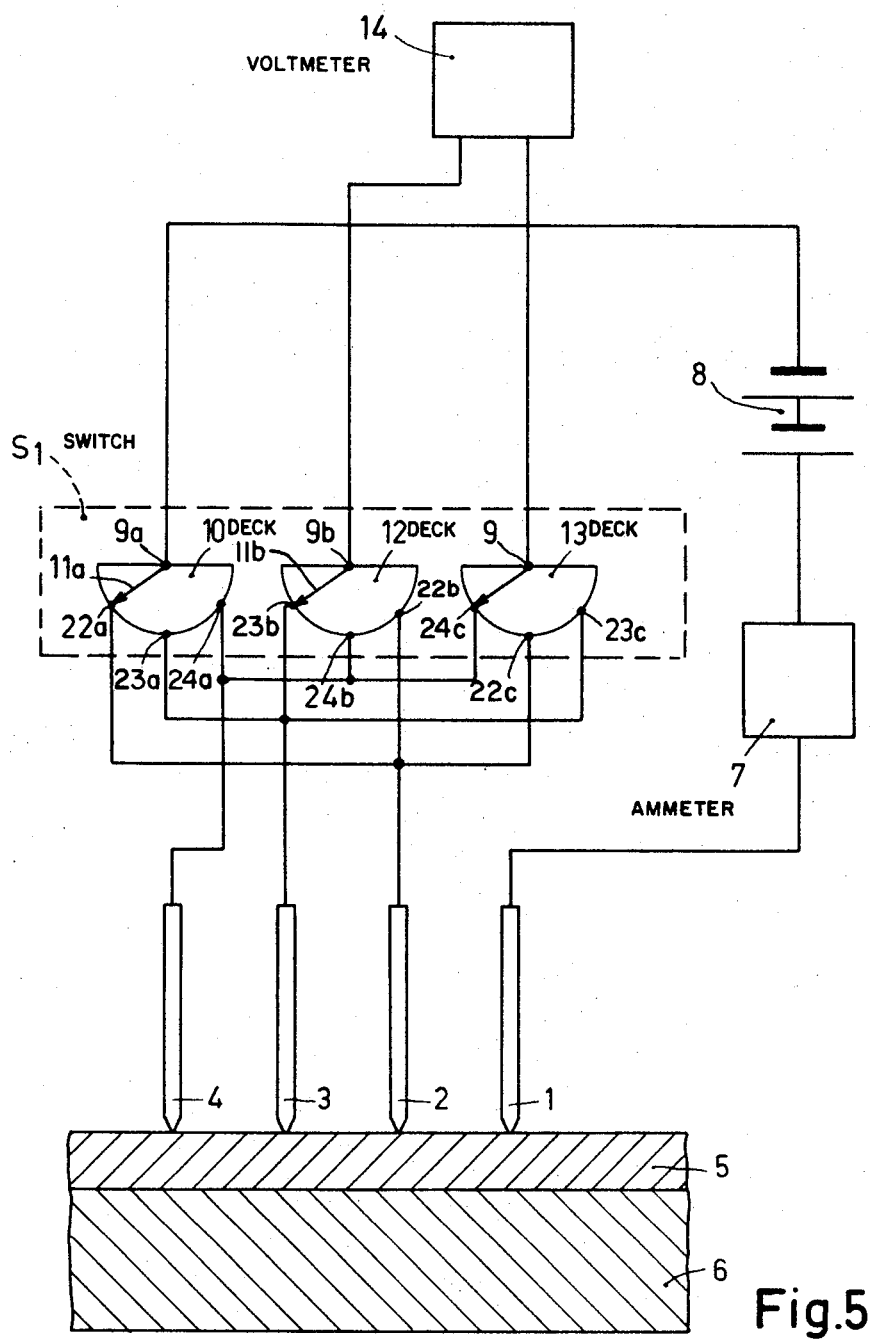
FIG. 5 shows diagrammatically a measuring device for use of the method according to the invention.
Figure 8:
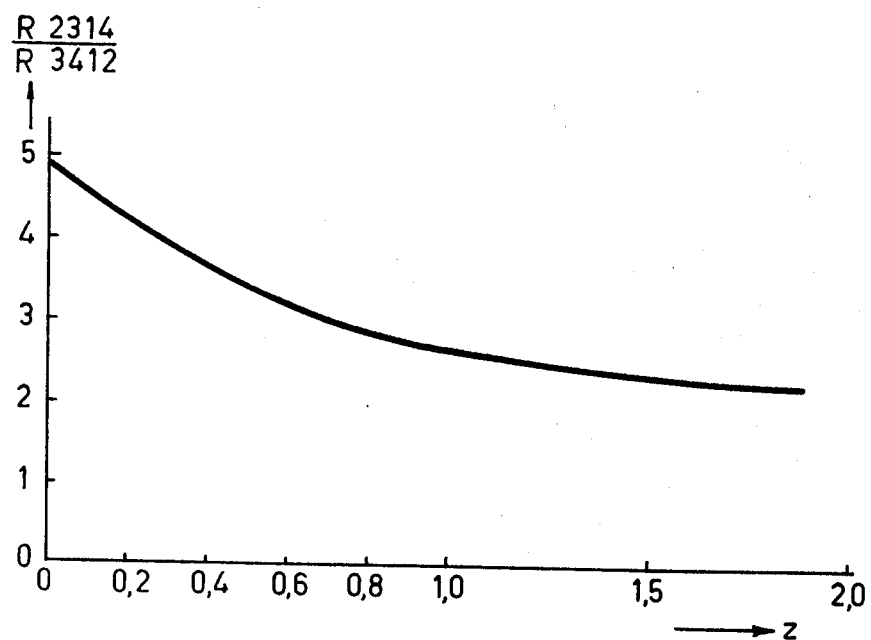

The invention will now be described in greater detail with reference to a practical embodiment which is shown diagrammatically in FIG. 5 in which four electrodes 1, 2, 3 and 4 are arranged on a layer 5 of one conductivity type which is provided on a substrate 6 of the opposite conductivity type. For this purpose, the layer 5 is a high-ohmic epitaxial layer of n-type silicon, thickness 5.5 $\mu$, which is uniformly doped with phosphourus, the substrate 6 consisting of a layer of p-type silicon, thickness 300 $\mu$, which is uniformly doped with boron. For the electrodes may be used the point electrodes of a four point meter which is marketed, for example, by Messrs. A. and M. Fell (Manf.) Limited. The thickness of the layer 5 is small with respect to the distance between the electrodes and is previously determined separately. The electrodes themselves are preferably arranged centrally on the disk the diameter of which is approximately 25 mm. The distance $s$ between two successive electrodes is 6.6 $10^{-2}$ cm. Electrode 1 is conductively connected to a device 7 for measuring currents. This may be, for example, a microammeter the other contact of which is connected, via a current source 8, to the fixed or master contact 9a of deck 10 of a three-deckswitch $S_1$. By means of the sliding contact 11a, the fixed contact 9a can alternately be connected to the contacts 22a, 23a and 24a of deck 10 which are conductively connected to the electrodes 2, 3 and 4, respectively, and to the contacts 22b, 23b and 24b, respectively, of the decks 12 and 13 of the switch $S_1$, the fixed contacts of which are conductively connected to a device 14 for determining voltages. This may be, for example, a voltmeter the input impedance of which is preferably so high that the current through the voltmeter may be neglected during the measurements the sliding contacts of decks 12 and 13 are designated as 11b and 11c, respectively.

The contacts on the three decks $S_1$ are interconnected in such manner that in each of the three positions of $S_1$ one pair of electrodes of the electrodes 2, 3 and 4 is connected to the voltmeter 14, the remaining electrode being connected to the current source 8. The measurements were carried out as follows: first a current $i_{14}$ was conveyed through the electrodes 1 and 4, the voltage $V_{23}$ being determined between the electrodes 2 and 3. By means of the measuring devices 7 and 14, a current $i_{14}$ of 0.5 $\mu$A and an associated voltage of 1.36 mV, respectively, were measured, a voltage resulting across the p-n junction which is smaller indeed than $KT/3q$ or smaller than 10 mV. From this it can be calculated that $R_{2314} = V_{23}/i_{14} = 2.72 \ 10^3$ Ohm.

By means of $S_1$ a current was then conveyed through the electrodes 1 and 3, the voltage being determined between the electrodes 2 and 4. In this case the current $i_{13}$ was again adjusted at 0.5 $\mu$A, the associated voltage being 0.01 mV. From these results it may be calculated that:

$$R_{2413} = V_{24}/i_{13} = 2.02 \ 10^3 \text{ ohm.}$$

A third measurement was then carried out in which a current was conveyed through the electrodes 1 and 2, the voltage being determined between the electrodes 3 and 4. In this case:

$$R_{3412} = 0.35 10^{-3}/0.5 10^{-6} = 0.7 \ 10^3 \text{ ohm.}$$

It can be calculated from the results obtained that $R_{2314}/R_{2413} = 1.35$, from which it follows in accordance with the graph shown in FIG. 7 that $z = 0.31$ or that $z^2 = 0.096$. It can furthermore be found out from the measured results of the three measurements that the determination of $z$ makes sense because the requirement that $R_{2314} = R_{2413} + R_{3412}$ is substantially satisfied. The value of $z$ thus found can now be substituted in the equation $$R_{2314} = \rho/2\pi d \ [ \ 2 \ K_0(z) - 2 \ K_0(2z)]$$

in which from graph 6 it can be determined that for the value of $z$ found the factor $f_1(z) = [2K_0(z) - 2K_0(2z)]$ is equal to 1.18 from which it follows for the sheet resistance $\rho/d$ that $$\rho/d = 2.72 \ 10^3 \times 2\pi/1.18 = 1.45 \ 10^4 \text{ ohm.}$$

Moreover it can be calculated from $$z^2 = s^2\rho/R_0 d$$

that in this case the resistance $R_0$ is equal to $6.63 10^2$ Ohm cm$^2$. Because the thickness of the layer is 5.5$\mu$, it can be calculated from the value of the sheet resistance found that the resistivity of the layer is 8.0 ohm cm. From this it follows that the concentration of doping material is approximately 5.5 $10^{14}$ dope atoms per cm$^3$.

It is to be noted that according to the conventional method of determining the sheet resistance from, for example, $R_{2314} = 2.72 \ 10^3$ ohm it would be found that $\rho/d = 1.22 \ 10^4$ ohm, which is more than 10 percent lower than the value calculated according to the invention.

It will be obvious that the invention may not be restricted to the above-described example but that many variations are possible to those skilled in the art without departing from the scope of this invention. For example, it is not necessary to carry out the three measurements at each time the same current. Combinations of electrodes other than those used in this example are suitable for the determination of the sheet resistance or a quantity associated therewith in accordance with the invention. It will be obvious from the above that the four electrodes need not necessarily be arranged on a straight line and at mutually the same distance and that more than four electrodes may also be used.

The method according to the invention may also be combined, for example, with a stray resistance measurement, in which the stray resistance of the point electrodes is determined as a result of which $\rho$ and $d$ can be determined separately. This is possible inter alia by carrying out an extra measurement, in which the electrodes between which the voltage is determined are connected to an extra shunt resistance known in value and the voltage between said electrodes is then determined again.

Furthermore, instead of the usual four point probe with metal tips which are subject to detretion and moreover involve a possibility of damage to the surface, a measuring probe may advantageously be used in the same manner in which a conductive liquid, for example mercury, as an electrode is contacted, via four adjacent bores in an insulating block, with a layer to be provided on the block with the perforations.

The layer to be measured may also form part of a test body which has been conducted along during the provision of the layer on other bodies, for example, of the same conductivity type, and may thus provide information on the sheet resistance of the other bodies.

Instead of direct current, the measurement may of course also be carried out with alternating current and alternating voltage, respectively, in which the contact resistance can be charged, if desirable, at higher frequencies, as a constant impedance.

It will furthermore be obvious that in the method and the measuring device according to the invention an electronic computer may advantageously be used which, when the measured results are supplied, immediately provides, for example, the required quantity $R_s$ and thus forms an automatic testing device.

What is claimed is:

1. A method of determining the sheet resistance (resistance per square) or a quantity associated with the sheet resistance, in particular in the manufacture of a semiconductor device, in which at least four electrodes are placed at a distance form each other on a layer to be measured, said layer changing into a second layer via a rectifying junction, in particular a p-n junction, a current being conveyed between two electrodes, the voltage associated with said current being determined between two other electrodes, the sheet resistance or a quantity associated with the sheet resistance being determined from the results of the measurements, characterized in that, after arranging the electrodes on the layer to be measured, at least two such measurements are carried out with the same arrangement of the electrodes on the layer and that said measurements are carried out with a voltage difference between the two current-conveying electrodes, in which across the rectifying junction and the p-n junction, respectively, a voltage difference is formed in a range of voltages across the rectifying junction the p-n junction, respectively, in which same behaves as a substantially constant resistance, preferably near the zero point of the current-voltage characteristic, and that during the first measurement a current is conveyed through two electrodes, hereinafter termed the first pair of electrodes, while the voltage is determined between two other electrodes, hereinafter termed second pair of electrodes, and that during the second measurement four electrodes are chosen having a different distance between at least two electrodes relative to the first measurement, in which a current is conveyed through two of these electrodes, while the voltage is determined between the two remaining electrodes of said electrodes, the sheet resistance or a quantity associated therewith being determined from the results of said measurements.

2. A method as claimed in claim 1, characterized in that four electrodes are arranged on the layer to be measured and that during the second measurement a current is conveyed through an electrode of the first pair of electrodes and an electrode of the second pair of electrodes, the voltage being determined between the remaining electrodes of the first and the second pair of electrodes, the sheet resistance of a quantity associated therewith being determined from the results of the two measurements.

3. A method as claimed in claim 1, characterized in that the contact resistance between the two layers is determined from the results of the measurements.

4. A method as claimed in claim 2, characterized in that after the second measurement a third such measurement is carried out with the same arrangement of the electrodes, a pair of electrodes being constituted by the electrode through which in the two preceding measurements current was conveyed and the electrode which was used in the two preceding measurements to determine the voltage, the two remaining electrodes constituting the second pair of electrodes, a current being conveyed through the electrodes of one of the two said pairs of electrodes, the voltage associated with said current being determined between the electrodes of the other pair of electrodes, information on the lateral uniformity of the layer and junction being obtained from the results of the three measurements.

5. A method as claimed in claim 2, characterized in that four punctiform electrodes are arranged on a surface of the layer to be measured, the electrodes at the surface being arranged on a straight line and at equal distances between two successive electrodes.

6. A method as claimed in claim 5, characterized in that the first pair of electrodes is constituted by the two outermost electrodes, the second pair of electrodes being constituted by the two innermost electrodes, the sheet resistance or a quantity associated therewith being determined from the results in cooperation with a previously composed table.

7. A method as claimed in claim 1 characterized in that the measurements are carried out at such low voltages between the current conveying electrodes at which the voltage across the junction is lower than $KT/q$ and preferably lower than $KT/3q$.

8. A method as claimed in claim 1, characterized in that a method is used on a layer of one conductivity type which is provided on a layer of the opposite conductivity type.

9. A method as claimed in claim 8, characterized in that the method is used on a thin and high-ohmic layer, the thickness of which is in particular smaller than 6 micron and the resistivity larger than 5 ohm cm.

10. A method as claimed in claim 8, characterized in that the method is used on a layer of one conductivity type on a substrate of the opposite conductivity type which has been conducted along as a test body during providing a layer of one conductivity type on a substrate of the same conductivity type, in which in the same circumstances a layer of one conductivity type is formed on the test body and on the substrate of one conductivity type, the sheet resistance or a quantity associated therewith of the layer of one conductivity type on the substrate of the same conductivity type being determined from the result of the measurement at the test body.

11. A method as claimed in claim 8, characterized in that the method is applied to a layer of one conductivity type on a substrate of the opposite conductivity type which has been conducted along as a test body during providing a layer of one conductivity type on a substrate of the opposite conductivity type, in which at the interface between the layer and the substrate are present locally buried layers of one conductivity type, the sheet resistance or a quantity associated therewith of the layer of one conductivity type on a substrate of the opposite conductivity type with the buried layers of one conductivity type locally present at the interface between the layer and the substrate being determined from the result of the measurements at the test body.

12. A measuring device for use in the method as claimed in claim 1 comprising at least four electrodes at a distance from each other in which a current can be conveyed through two electrodes and the voltage can be determined between two other electrodes, characterized in that means are present by which a current can be conveyed through two electrodes, while the voltage can be determined between two other electrodes, said four electrodes constituting a first electrode combination, and by which a second combination of four electrodes can then be chosen with a different distance between at least two electrodes relative to the first combination of four electrodes, in which a current can be conveyed through two electrodes of the second combination, while the voltage can be determined between the two remaining electrodes of the second combination.

* * * * *